United States Patent [19]

Lecomte et al.

[11] Patent Number: 5,608,627
[45] Date of Patent: Mar. 4, 1997

[54] DEVICE FOR SUPERVISING THE PROPULSION SYSTEM OF AN AIRCRAFT

[75] Inventors: Pierre Lecomte, Aureville; Laurent Coquin, Toulouse, both of France

[73] Assignees: Aerospatiale Societe Nationale Industrielle, Paris; Aerospatiale Protection Systemes APSYS, Mantes-la-Jolie, both of France

[21] Appl. No.: 308,427

[22] Filed: Sep. 19, 1994

[30] Foreign Application Priority Data

Sep. 17, 1993 [FR] France .................................. 93 11100

[51] Int. Cl.$^6$ .................................................. G06F 11/00
[52] U.S. Cl. .............................. 364/424.012; 364/551.01; 364/424.034; 371/67.1
[58] Field of Search ......................... 364/424.03, 424.04, 364/431.01, 431.02, 431.03, 550, 551.01; 371/67.1; 395/182.08, 182.09, 182.1, 185.01

[56] References Cited

U.S. PATENT DOCUMENTS

| | | | |
|---|---|---|---|
| 4,032,757 | 6/1977 | Eccles | 364/431.02 |
| 4,215,412 | 7/1980 | Bernier et al. | 364/431.02 |
| 4,356,546 | 10/1982 | Whiteside et al. | 371/67.1 |
| 4,432,064 | 2/1984 | Barker et al. | 364/550 |
| 4,644,538 | 2/1987 | Cooper et al. | 395/182.08 |
| 4,884,204 | 11/1989 | Seibt et al. | 364/431.03 |
| 5,067,080 | 11/1991 | Farman | 364/431.01 |
| 5,274,554 | 12/1993 | Takats et al. | 364/424.03 |

FOREIGN PATENT DOCUMENTS

| | | |
|---|---|---|
| 2052801 | 1/1981 | United Kingdom. |
| 2110421 | 6/1983 | United Kingdom. |

*Primary Examiner*—Gary Chin
*Attorney, Agent, or Firm*—Fisher, Christen & Sabol

[57] ABSTRACT

The present invention relates to a device for supervising the propulsion system of an aircraft, including a set of sensors (C1, C2, Cn) delivering information regarding the propulsion system. According to the invention, the device moreover includes:

- a set of peripheral computers (M1, M2, Mp) each implementing a mathematical model representing a subsystem of propulsion system; and
- a main computer (CAL), which is linked to the set of sensors (C1, C2, Cn) and to the set of peripheral computers (M1, M2, Mp), which checks the intercompatibility of the information delivered by the sensors (C1, C2, Cn) and the compatibility between the information delivered and the results provided by the peripheral computers (M1, M2, Mp).

2 Claims, 1 Drawing Sheet

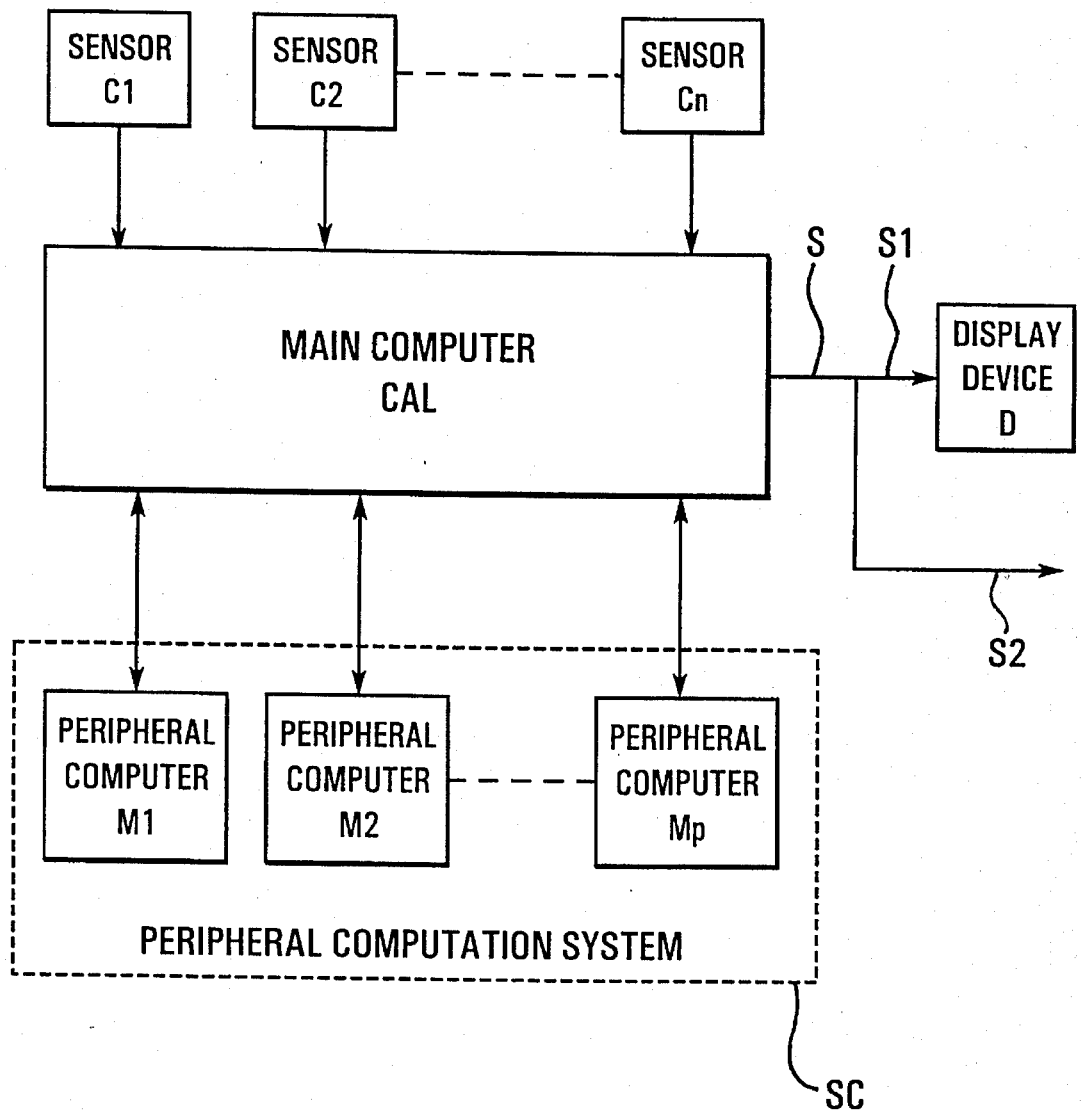

DEVICE FOR SUPERVISING THE PROPULSION SYSTEM OF AN AIRCRAFT

BACKGROUND OF THE INVENTION

1. Field of the Invention

The present invention relates to a device for supervising the propulsion system of an aircraft, for example, of an airplane or a helicopter. In the context of the present invention, a propulsion system is understood to mean one or more propulsion sub-systems, each of these propulsion sub-systems including an engine with all of its movable elements and its monitoring systems, an air intake with its adaptor devices, and a nozzle possibly incorporating thrust reversal with the associated command, control and monitoring devices. In the case of a turbine engine, each of these propulsion sub-systems includes, moreover, devices for controlling and regulating the propeller, the rotor, or the "propfan" which this turbine engine drives.

2. Background Art

This propulsion system is extremely complex, thus making it very difficult for the crew monitoring it to observe and consolidate all the available information relating to it, Analysis of accidents or incidents arising in service shows that there is a significant number of cases in which the crew makes an appreciable error of assessment regarding the actual state of the propulsion system of the aircraft, as a consequence of poor interpretation of the information received.

It is known that, in order to pilot the propulsion system of an aircraft, the crew needs a certain amount of information, generally obtained by way of sensors intended to monitor certain important items of the propulsion system. The crew is thus aware of primary parameters, such as, for example, the EGT temperature and the speeds N1 and N2 of the rotors, and of secondary parameters, such as, for example, the level of the vibrations associated with the speeds N1 and N2, the temperature of the nacelles, the pressure or the fuel consumed. For example, in modern airplanes, this information is available in the EWD and SD ("Engine and Warning Display", "System Display") type images presented on a cathode-ray screen.

It is also known that warning devices are associated with some of these sensors, making it possible to advise the crew of an abnormal level of the values of the parameters monitored by these sensors. However, these warning devices exist for only a very limited number of sensors and they allow supervision of certain particular items only, and not overall supervision of the whole propulsion system.

No on-board device for overall supervision of the propulsion system of an aircraft exists.

Furthermore, the various parameters measured are generally redundant, both at the level of any one parameter, and also and especially through possible cross-checks between parameters, for example, between the rotation speeds of the various moving parts, the flow rate of fuel, certain characteristic pressures, the position of the movable elements, etc.

Cross-checks are, therefore, generally possible. However, they are not all that easy for the crew, especially under operational conditions, where the decision time is limited and where the crew is subject to numerous demands and constraints.

BROAD DESCRIPTION OF THE INVENTION

The object of the present invention is to remedy the absence of overall supervision of the propulsion system and to enable the crew to consolidate the multitude of varied information available regarding the propulsion system.

It is true that devices already exist for supervising the propulsion system, at the aircraft maintenance equipment level.

These devices make it possible, using very complex models of the propulsion system, to forecast degradations of the system by observing, in non-real time, certain parameters recorded during several flights. The information obtained from these devices is not, however, immediately available and is, therefore, not accessible to the crew during the flight.

Furthermore, models of engine operation exist, as used by engine manufacturers to ascertain, accurately, the behavior and performance of the engine. However, these extremely complex models cannot be stowed on board an aircraft and the information provided is utilized in non-real time only.

The object of the present invention is, therefore, more particularly to provide a device for global supervision of the propulsion system, which can be stowed on board an aircraft, the information provided by which thereby being directly available to the crew. It will be noted that the object of the invention is not to replace the detailed diagnostics intended for maintenance or for medium-term prevention of serious incidents, but rather is to avoid the crew making an error of assessment about the actual state of the propulsion system, of such a nature as to jeopardize safety in the short term.

For this purpose, according to the invention, the device for supervising the propulsion system of an aircraft, including a set of sensors delivering information regarding the propulsion system, is notable in that it includes:

a set of peripheral computers each implementing a mathematical model representing a sub-system of the propulsion system; and a main computer, which is linked to the set of sensors and to the set of peripheral computers, which coordinates the computations of the peripheral computers, which checks, on the one hand, the intercompatibility of the information delivered by the sensors and, on the other hand, the compatibility between the information delivered by the sensors and the results provided by the peripheral computers, and which signals any detected incompatibility.

Thus, the supervising device, by checking compatibility between the information available and the mathematical models, consolidates all this information, detects any inconsistencies and can then either diagnose abnormal operation of a sensor when the information provided by various sensors is mutually incompatible, or diagnose incorrect running or abnormal behavior of the propulsion system when the information provided by the sensors is incompatible with the results of the computations. Based on this consolidation, the crew can make an exact mental representation of the actual state of the propulsion system, thus, considerably reducing the risks of an accident.

By way of example, the running of certain jet engines calls upon various measurements of pressure in the air intake, as well as upon a quotient of such measurements termed the "EPR". If, for any reason (icing, ingestion of a foreign body, structural deformation as a consequence of an impact, etc.), this measurement is erroneous, the crew may display an apparently correct, but actually false, value and control their engine in such a way that it does not deliver the requisite thrust. The device, which is the subject of the invention, will detect for example that the set of measurements (EPR quotient, flow rate of fuel, speeds of the moving parts, temperature at turbine level, etc.) is not consistent and that it is the EPR quotient which is incorrect. This will allow the crew to interrupt their take-off if the incident occurs during this phase or to modify the operating speed of their engine with the aid of secondary parameters in the contrary case.

An analogous consistency test is possible on an airplane with a turbine engine driving a propeller. The power delivered is generally known from measurement of the torque transmitted and the rate of rotation of the propeller. It can also be deduced from the internal operating parameters of the turbine engine. A significant inconsistency makes it possible, for example, to distrust the operation of the engine or the operation of the propeller.

On a supersonic airplane, whose air intake and nozzle, which are necessarily complex, possess appropriate regulating systems, the same sort of consistency checks are possible.

Advantageously, the peripheral computers are grouped together into a single peripheral computation system implementing an overall mathematical model of the propulsion system.

It will be noted that the engine manufacturer has a mathematical model of his engine. The same is the case for the propeller manufacturer in regard to his propeller, and for the designer of the air intake in regard to the latter. These partial models are, therefore, available to allow the formulation of an overall model of the propulsion system of the aircraft.

The computers used can be analog or digital. They can be programed sequentially or by the techniques of artificial intelligence.

Furthermore, the computers are either independent, or integrated into other computers already existing on board the aircraft. Preferably, they are nevertheless independent of the computers charged with ensuring the monitoring of the propulsion system, so as to incorporate the latter computers within the overall supervision.

The main computer, therefore, outputs signals representative of the detected incompatibility, it being possible for the signals to be used for visualization purposes or to be transmitted to other devices or computers capable of utilizing them.

As, through the supervising device according to the invention, the parameter whose value does not correspond to that of normal operation can be determined, the operators can be made aware of it directly if this is judged to be necessary at the time the device is produced, or not if this is judged not to be necessary. It is also possible to envisage isolating this parameter if the redundancies so permit, or even to continue to take it into consideration in subsequent operations. However, in general, the supervising device according to the invention determines firstly whether the parameter whose value does not correspond to that of normal operation is not revealing, by carrying out at that precise moment the appropriate tests, the failure of a sensor rather than an operating anomaly. The operators are or are not then informed of the result of these tests depending on the danger level which may be estimated in this situation. In the case where a sensor has been determined as defective, the supervising device according to the invention can henceforth ignore the information which it is transmitting or reconstruct, from the other information available, the missing information.

Furthermore, it is possible to envisage, with the aim of enhancing the device according to the invention, specifying to the operators the corrections to be made or the steps to be taken to rectify a detected anomaly as quickly and efficiently as possible.

BRIEF DESCRIPTION OF THE DRAWING

The single figure of the appended drawing represents the block diagram of a propulsion system supervising device according to the invention.

It makes it possible fully to appreciate how the invention can be embodied.

DETAILED DESCRIPTION OF THE INVENTION

The propulsion system supervising device, according to the invention and represented in the single figure of the drawing, includes a set of sensors C1 to Cn, a main computer CAL and a peripheral computation system SC consisting of a set of peripheral computers M1 to Mp.

The sensors C1 to Cn detect parameters characteristic of the operation of the propulsion system. For example, with respect to the engine, these may be the speeds of the moving parts, the characteristic temperatures and pressures, the flow rate of fuel or the position of movable elements. With respect to a propeller or a "propfan", it is possible, for example, to pick out the propeller speed, the torque transmitted, the pitch, as well as the differences in pressure on either side of the disc. With respect to an air intake, they may be, in particular, the position of movable elements or characteristic pressures. It is possible, moreover, to add thereto a few general measurements, such as, the altitude, the flight Mach number or the total temperature.

The sensors C1 to Cn are usually sensors existing on board. However, certain sensors may be specially arranged on the propulsion system so as to deliver particular information necessary for the implementation of the present invention.

The peripheral computers M1 to Mp and the main computer CAL hold a mathematical model of the propulsion system, determined as explained above from partial models provided, in particular, by the engine and propeller manufacturers. Depending on the objective pursued and on the retention or otherwise of certain warning devices already existing on board, it is possible to choose wider or narrower anomaly detection thresholds and, accordingly, to use a more or less simplified mathematical model.

The computer CAL, linked to the set of sensors C1 to Cn and to the set of peripheral computers M1 to Mp, therefore, checks compatibility between the information transmitted by the sensors C1 to Cn and the mathematical model, while obviously taking the tolerances and measurement errors into account.

The computer CAL delivers, at its output S, signals representative of any incompatibility which might be detected and which can be displayed, by way of a link S1, on a display device D, as well as any suggestions for corrective actions, and/or which may be transmitted, by way of a link S2, to other user devices (not represented), such as for example warning lights or generators of audible alarms which are more effective in alerting the operators than the simple displaying of a message on a screen.

What is claimed is:

1. A device for supervising the propulsion system of an aircraft, said propulsion system having a plurality of subsystems and said supervising device comprising:

a plurality of sensors sensing parameter values of said propulsion system;

a plurality of peripheral computers, each implementing a mathematical model representing one of said subsystems; and a main computer connected to said sensors and to said peripheral computers, said main computer:
 (a) coordinating the computation of said peripheral computers;
 (b) checking the mutual compatibility of the parameter values sensed by said sensors;
 (c) checking the compatibility of said parameter values sensed by said sensors in relation with said mathematical models; and
 (d) signalling any detected incompatibility of steps (b) and (c).

2. The supervising device as claimed in claim 1, wherein said peripheral computers (M1, M2, Mp) are grouped together into a single peripheral computation system (SC) implementing an overall mathematical model of said propulsion system.

* * * * *